D. HESS.
Horse-Power.
No. 214,564. Patented April 22, 1879.
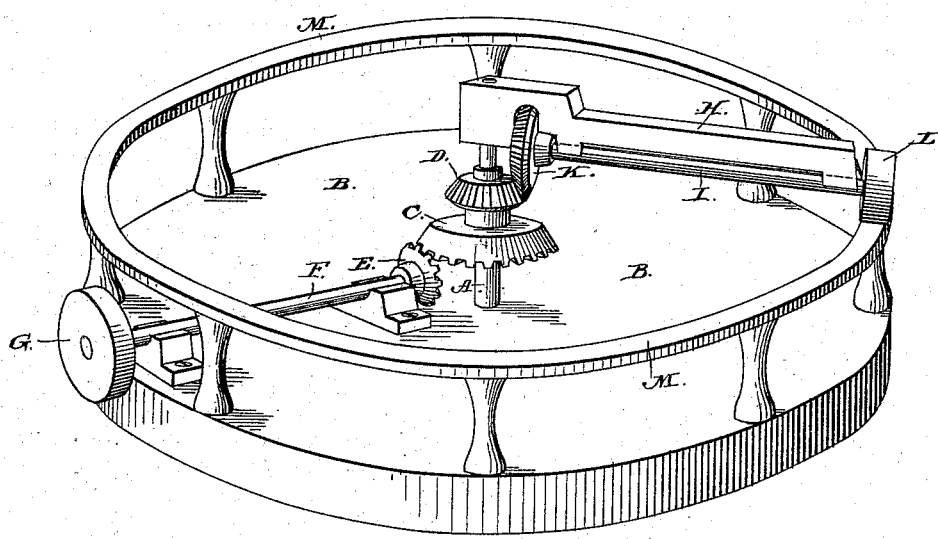
WITNESSES
INVENTOR
Daniel Hess,
By H. J. Ennis,
ATTORNEY

UNITED STATES PATENT OFFICE.

DANIEL HESS, OF EVANSVILLE, INDIANA.

IMPROVEMENT IN HORSE-POWERS.

Specification forming part of Letters Patent No. 214,564, dated April 22, 1879; application filed March 24, 1879.

*To all whom it may concern:*

Be it known that I, DANIEL HESS, of Evansville, in the county of Vanderburg and State of Indiana, have invented certain new and useful Improvements in Horse-Powers; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The figure in the drawing is a perspective view fully illustrating my invention.

This invention has relation to improvements in traction horse-powers; and it consists of certain improvements in the construction and operation of the same, hereinafter more fully described, and particularly pointed out in the claim.

In the drawing accompanying this invention similar letters of reference marked thereon indicate like parts of the invention.

An upright non-revolving shaft, A, is firmly secured to the base B, which may be the ground if set up outside, or the floor if the machine is set up in a building. The shaft A is provided with and forms the journal for a pair of bevel-gears, C and D, placed back to back, the lower one of which, C, is the largest and has its teeth extending downward, meshing in a similar though smaller gear, E, secured to the inner end of a shaft, F, extending radially outward, and provided at its extreme outer end with a pulley or band-wheel, G. The bevel-gear D is rigidly secured to its mate C; consequently revolves with it on the stationary shaft A.

A beam, H, forms the guide and support for the shaft I, and is journaled at its inner end, so as to revolve around the shaft A. The shaft I has a bevel-gear, K, secured upon its inner end, so as to mesh or gear with the wheel D. The outer end of the shaft I has secured to it a traction-wheel, L, which revolves upon the endless track M.

The operation of the device is follows: One or more horses being hitched to the beam H, near its outer end, so as to travel inside the track M, the traction-wheel L, coming in contact with the track M, is caused to revolve, it in turn revolving the shaft I and gear K, communicating motion to the gears D and C, thence to the gear E, shaft F, and band-wheel or pulley G. From the wheel or pulley G, by means of belts, motion may readily be communicated to thrashers, grinding-mills, &c.

The simplicity, utility, and convenience of this invention are obvious, and need no further description.

I am aware that a horse-power for increasing the speed of machinery, consisting of a revolving wheel or frame having the drive-wheel mounted on a horizontal shaft, meshing with a gear-wheel in connection with a circular rack and cog-wheel meshing therewith, is old, and such I do not desire to claim as my invention; but,

Having thus described my invention and the operation of the same, what I claim as new and useful, and desire to secure by Letters Patent of the United States, is—

In a horse-power, the fixed non-revolving shaft A, forming a journal for beam H, gears C and D, with faces reversed, the reverse gear, C, meshing with and locking in place the pinion E, shaft F, and band-wheel G, substantially as and for the purpose herein shown and described.

In testimony that I claim the foregoing I hereunto set my hand this 18th day of March, 1879.

DANIEL HESS.

Witnesses:
WILLIAM TEAMER,
JOHN H. MESKER.